Jan. 30, 1951    G. E. PURDY    2,539,972
WAGON AND TRAILER HITCH
Filed Jan. 14, 1948    2 Sheets-Sheet 1
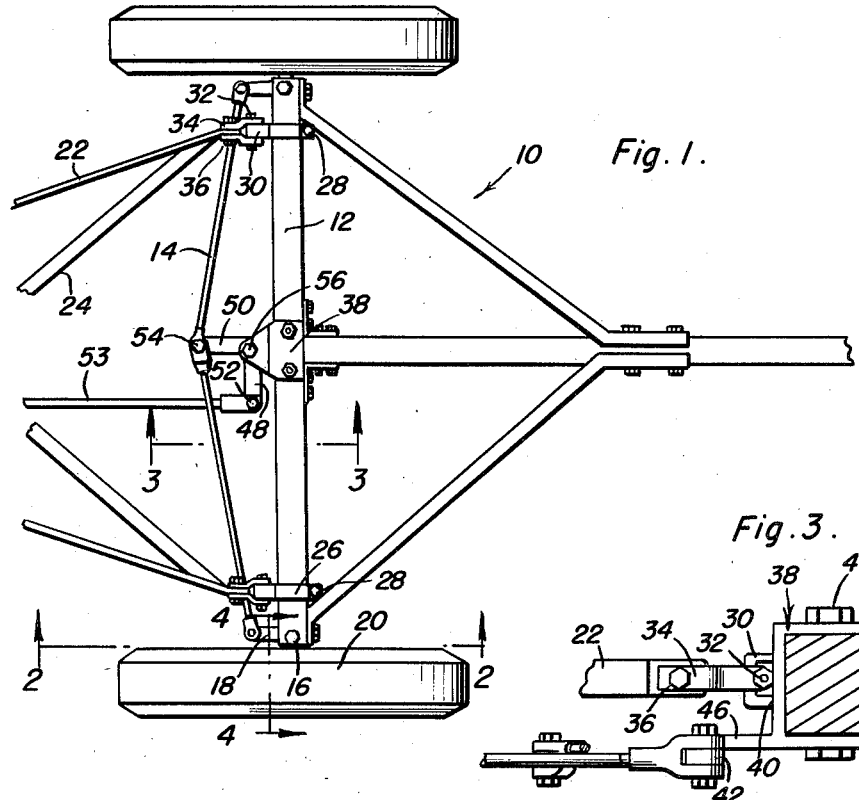
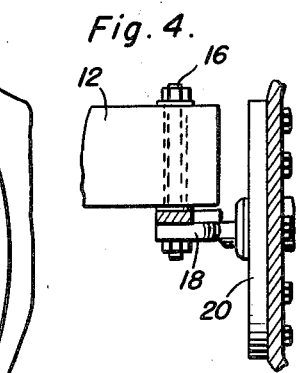
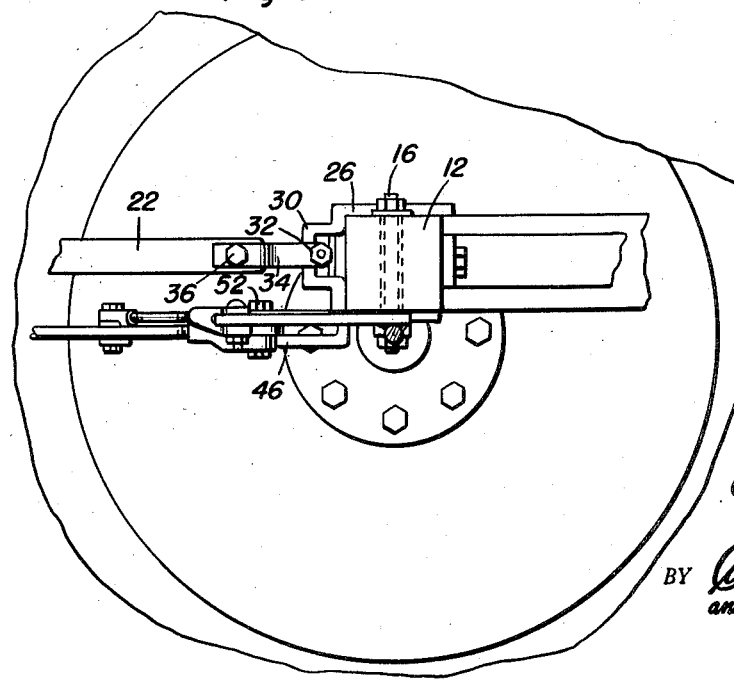
George E. Purdy
INVENTOR.

Jan. 30, 1951 G. E. PURDY 2,539,972
WAGON AND TRAILER HITCH
Filed Jan. 14, 1948 2 Sheets-Sheet 2
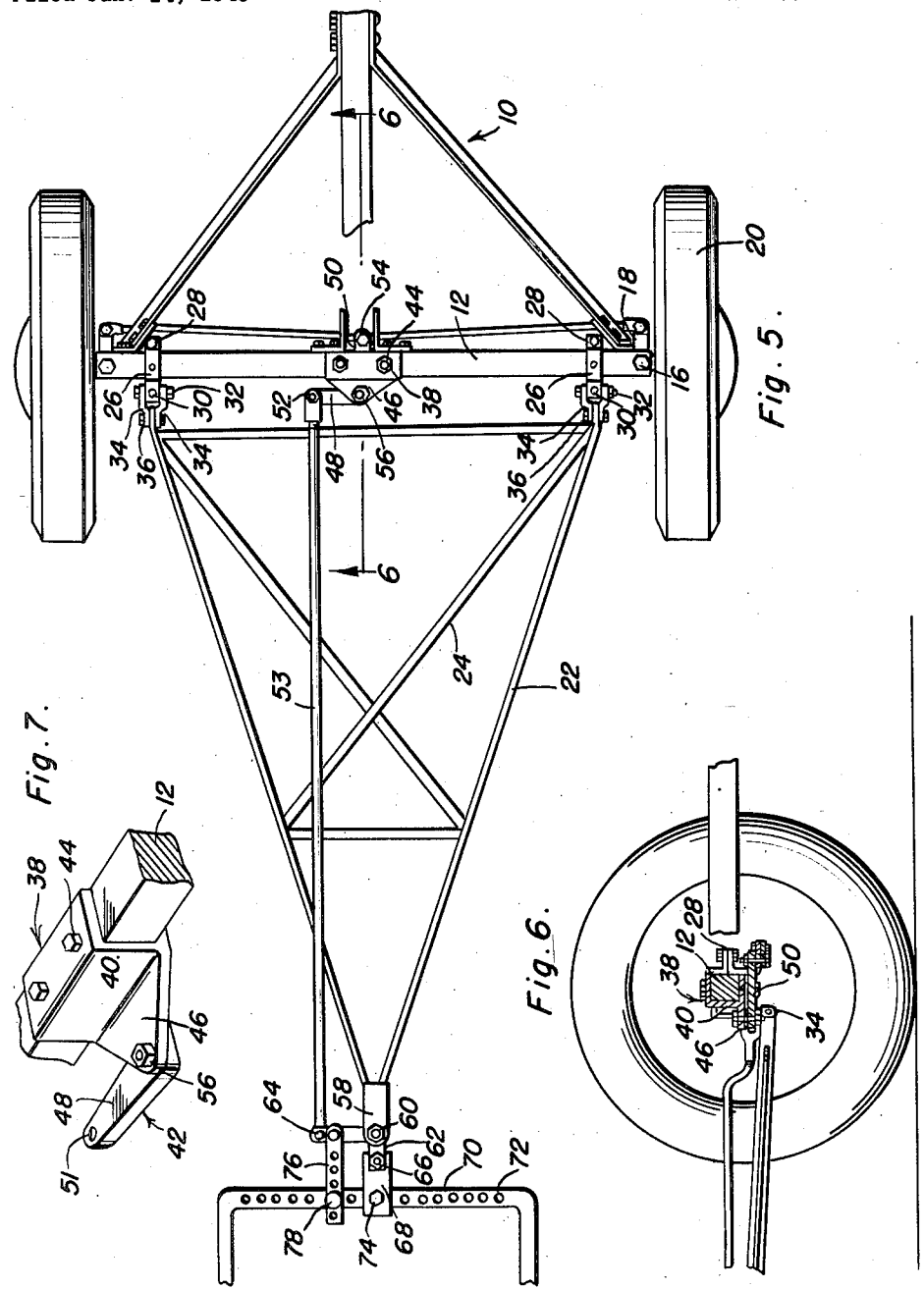
George E. Purdy
INVENTOR.

Patented Jan. 30, 1951

2,539,972

UNITED STATES PATENT OFFICE 2,539,972

WAGON AND TRAILER HITCH

George E. Purdy, Libertyville, Ill.

Application January 14, 1948, Serial No. 2,149

2 Claims. (Cl. 280—33.55)

This invention relates to a wagon and trailer hitch and has for its primary object the provision of an adjustable steering control mechanism which controls the front wheels of the wagon so that they travel always in the same direction as the rear wheels of the towing vehicle or tractor.

A novel feature of this invention resides in the provision of means for engaging a towing vehicle which includes a yoke having a plurality of pin engaging apertures in its web portion to which may be adjustably secured a drawbar and a steering link.

Another novel feature of this invention resides in a steering linkage of such construction that it may readily and easily be secured to the axle of a trailer and at the same time provide means whereby the tie rod and the drag link may be pivotally connected. This steering linkage is adaptable for links and tie rods with drag links in trailers where the tie rod may be behind or in front of the axle.

These, together with various ancillary objects and features of the invention which will later become apparent as the following description proceeds, are attained by the device, a preferred embodiment of which has been illustrated by way of example only in the accompanying drawings, wherein:

Figure 1 is a plan view of the steering linkage and actuating parts attached to a trailer wherein the tie rod is found in front of the axle;

Figure 2 is a fragmentary sectional view showing some parts in elevation taken substantially along the plane 2—2 of Figure 1;

Figure 3 is a fragmentary sectional view showing some parts in elevation taken substantially along the plane 3—3 of Figure 1;

Figure 4 is a fragmentary sectional view showing some parts in elevation taken substantially along the plane 4—4 of Figure 1;

Figure 5 is a plan view of the steering mechanism and actuating parts, together with the adjustable hitch, attached to a trailer wherein the tie rod is found behind the axle;

Figure 6 is a fragmentary sectional view taken substantially along the plane 6—6 of Figure 5;

Figure 7 is an isometric view showing the manner in which the steering linkage is clamped to the axle.

Specific reference is now made to the drawings. In the several views in the accompanying drawings, and in the following specification reference characters indicate corresponding elements throughout.

Generally indicated at 10 is a conventional trailer supporting frame which is securely fixed by means of bolts or screws to steering axle 12.

At the ends of axle 12 adjacent to the wheels will be found a bolt 16 disposed through said axle and pivotally securing to the axle a substantially L-shaped member 18 one leg of which is secured to wheel 20, the other leg of which is pivotally secured to tie rod 14. Generally indicated at 22 is a frame or tongue with supporting braces 24. This frame or tongue is pivotally secured to the axles in the following manner. A split clamp or collar 26 is provided with a bolt 28 through the lip of said collar or clamp for tightening said clamp around the axle. Contiguous with this clamp is a loop member 30 with a bolt 32 therethrough pivotally engaging clamping plates or straps 34 which clamps or straps are, in turn, secured to frame 22 by means of a bolt 36.

Generally indicated at 38 is a steering linkage comprising a vertical member or clamp 40 and a horizontal bellcrank 42. The steering linkage is secured to the axle by a series of bolts 44 passing through the vertical member 40 and the axle 12. Contiguous with and horizontal to vertical clamp member 40 on the steering linkage is a lip 46 to which the bellcrank 42 is pivotally hinged at its corner via bolts 56. Bellcrank 42 consists of two legs 48 and 50 with apertures at the ends thereof as shown at 51. Leg 48 is made to pivotally engage drag link 53 by means of bolt 52, while the other arm of the bellcrank 50 pivotally engages tie rod 14 substantially at its center by means of bolt 54. At the apex of frame or tongue 22 a flat plate 58 is welded, one end of which plate is provided with an aperture through which is disposed a bolt 60 which pivotally engages an L-shaped link member 62 at its corner. The long arm of link 62 is fixedly engaged at the end thereof to drag link 53 as shown at 64. The short arm is provided with an aperture at the end thereof for receiving a bolt 66 which pivotally engages drawbar 68.

Adjacent said link member 62 a tractor drawbar in the form of a clevis or yoke is provided as at 70 with perforations 72 in the web portion thereof. Drawbar 68 and tractor drawbar 72 are secured to the tractor (not shown), the towing of the trailer being accomplished mainly by these two elements. Drawbar 68 is provided with an aperture which may be aligned with one of the central perforations in yoke or clevis 72 to receivably and pivotally engage a bolt 74.

A single or pair of perforated flat plates or steering links 76 is fixedly secured to the long arm or leg of L-link 62 adjacent the end of drag link 53, and the other end of steering link 76 is pivotally secured via a bolt or ball and socket mechanism through any one of its desired apertures or perforations when aligned with a desired aperture or perforation on the web portion of tractor drawbar 70 as shown at 78. Thus it will be seen that the hitch and steering link mechanism is adjustable to any position on a tractor drawbar via perforations on the web portions of the drawbar.

The steering mechanism operates in the following manner. When the tractor turns in a given direction, steering link 76 and drawbar 68 will be caused to turn in the same direction, thereby causing link 62 to turn and impel drag link 53 which pushes or pulls the bellcrank of steering linkage 38, which bellcrank, in turn, pushes or pulls tie rod 14 causing the wheels of the trailer to turn in the same direction as the wheels of the tractor.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. In a trailer including a drawbar, a hitch pivotally attached to said drawbar, a drag link, steerable wheels on said trailer, steering linkage connected to said wheels and said drag link, a tongue connected to said hitch and said trailer, the improvement comprising a tractor drawbar in the form of a clevis having a perforated web, a flat plate pivotally attached to a central perforation in said web, an L-shaped link, the shorter leg of said link being pivotally attached to said plate, the corner of said link being pivotally attached to said trailer drawbar, the longer leg of said link being fixedly secured to the drag link, a pair of perforated flat plates fixedly attached at their ends to said longer leg of said link and adjustably and pivotally secured at their other ends to the perforated web through a perforation.

2. The combination of claim 1, wherein said tongue is substantially triangular in shape and pivotally attached to the axle between the wheels at its base angles.

GEORGE E. PURDY.

REFERENCES CITED

The following references are of record in the file of this patent:

UNITED STATES PATENTS

| Number | Name | Date |
|---|---|---|
| 2,092,683 | Stidham | Sept. 7, 1937 |
| 2,100,447 | Mahaffey | Nov. 30, 1937 |
| 2,258,678 | Elwood | Oct. 14, 1941 |
| 2,273,410 | Lux | Feb. 17, 1942 |